Jan. 27, 1970  J. A. ILLER  3,491,977
LEVELING MOUNT
Filed Jan. 18, 1968  2 Sheets-Sheet 1
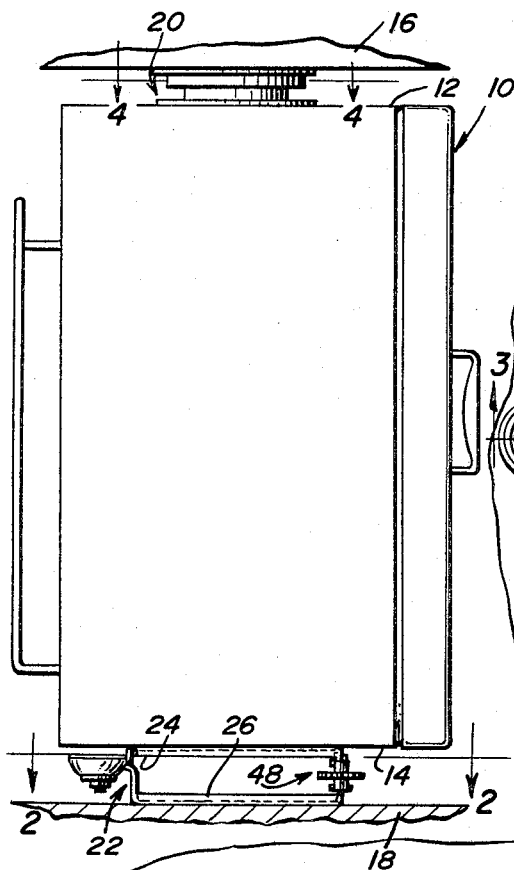
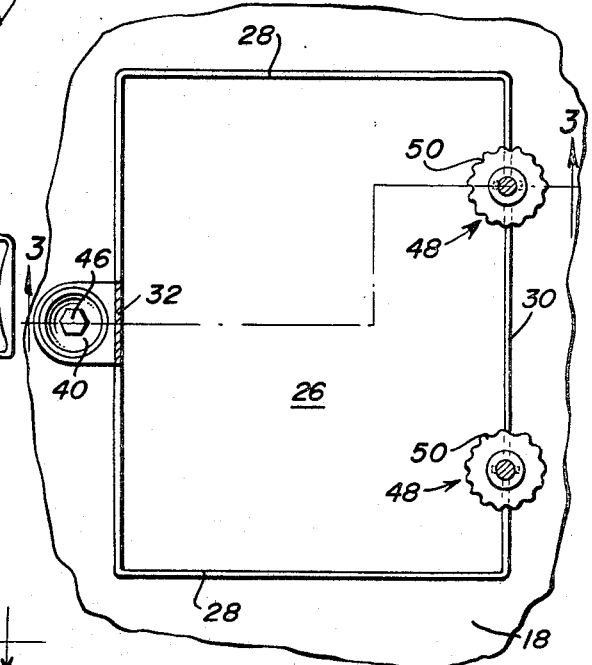
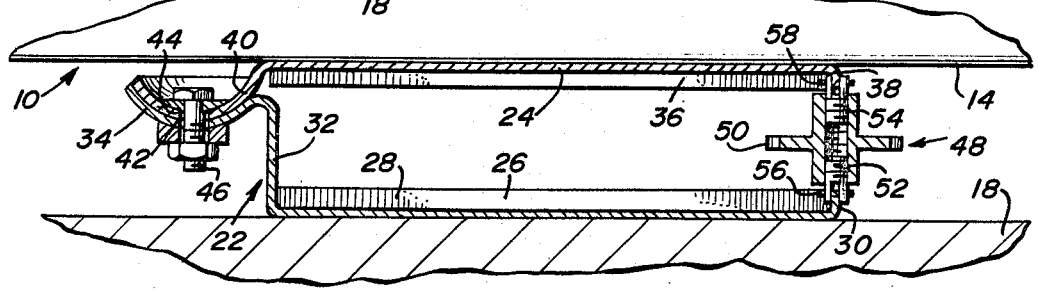
John A. Iller
INVENTOR.

Jan. 27, 1970   J. A. ILLER   3,491,977
LEVELING MOUNT
Filed Jan. 18, 1968   2 Sheets-Sheet 2

John A. Iller
INVENTOR.

BY Clarence A. O'Brien
and Harvey B. Jacobson
Attorneys

3,491,977
LEVELING MOUNT
John A. Iller, Seattle, Wash., assignor of fifty percent to
Adabelle E. Iller, Seattle, Wash.
Filed Jan. 18, 1968, Ser. No. 698,812
Int. Cl. F16m 7/00, 9/00
U.S. Cl. 248—358                                    10 Claims

ABSTRACT OF THE DISCLOSURE

An assemblage including upper and lower components for support of the upper and lower ends of an upstanding member disposed between an overhead and an underneath support structure, one of said components defining a universal connection between one vertical end portion of the upstanding member and the corresponding support structure and the other of said components being connected between the other end of the upstanding member and the opposing support structure and operable to yieldingly resist movement of the other end of the upstanding member transversely of the line extending between the two ends of the upstanding member.

---

The leveling mount includes first and second components thereof for securement to the upper or lower end of an upstanding member and a support structure spaced vertically relative to the supported end of the upstanding member. The two components of the leveling mount define coacting ball and socket members secured together against separation whereby the supported upstanding member may be universally angularly adjusted about an upstanding axis and means is provided whereby the supported upstanding member may be constrained against angular displacement from a desired selected position of the supported upstanding member.

One form of the support mount utilizes a ball and socket construction which may be locked against relative movement between the ball and socket portions thereof and also includes supplemental means connected between the two components of the mount which coact with the ball and socket members to lock the two components against adjustment relative to each other. A second form of the leveling mount utilizes ball and socket components which are freely movable relative to each other and provides means whereby the remote end of the supported upstanding member is yieldingly braced against lateral displacement relative to an upstanding axis. Further, the last-mentioned means of the second form of leveling mount may also be utilized in conjunction with the first form of leveling mount at the end of the supported upstanding member remote from the first form of leveling mount.

The leveling mount of the instant invention is particularly well adapted to support upstanding members from upper and lower support structures between which the upstanding member extends. The leveling mount includes a first component adapted to establish a universal connection between a member to be supported and an opposing support structure and one form of the first component includes means by which the member being supported therefrom may be retained in adjusted angulated position. The second component may or may not be used in conjunction with that form of the first component operable to retain the supported member in adjusted angular position and establishes no more than a yieldable connection between the supported member and an opposing support structure resisting movement of the adjacent portion of the supported member in all directions in a single plane with no connection between the supported member and the adjacent support structure being provided to control movement in a direction disposed normal to the aforementioned plane.

The main object of this invention is to provide a support assembly which may be utilized to support a member from a support structure in a manner whereby the member supported may be adjustably leveled relative to its supporting structure.

Another object of this invention is to provide a support structure for supporting a member in an insulated manner against vibrations.

Still another object of this invention is to provide an assembly for supporting a member to be supported for automatic leveling adjustment through a limited range.

A final object of this invention to be specifically enumerated herein is to provide a device in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a refrigerator operatively supported in an upright position between upper and lower support structures by means of the mount assembly of the instant invention;

FIGURE 2 is an enlarged horizontal sectional view taken substantially upon the plane indicated by the section line 2—2 of FIGURE 1;

FIGURE 3 is an enlarged fragmentary vertical sectional view taken substantially upon the plane indicated by the section line 3—3 of FIGURE 2;

Figure 4:
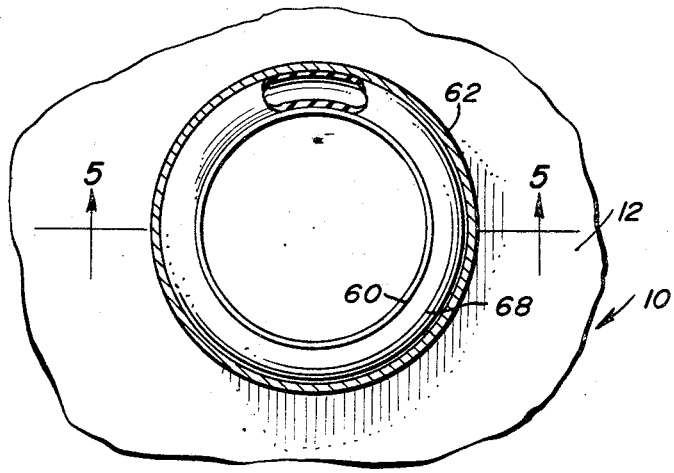
FIGURE 4 is an enlarged fragmentary horizontal sectional view taken substantially upon the plane indicated by the section line 4—4 of FIGURE 1.
Figure 5:
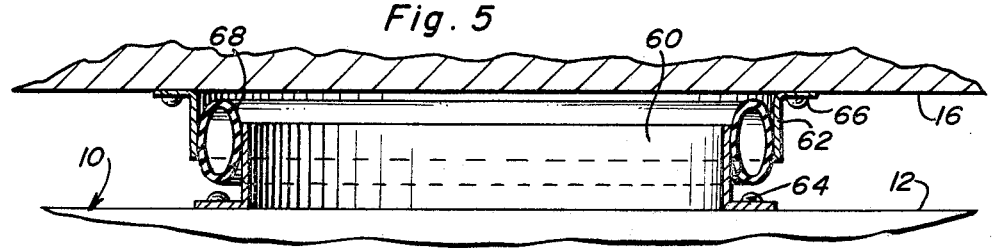
FIGURE 5 is an enlarged fragmentary vertical sectional view taken substantially upon the plane indicated by the section line 5—5 of FIGURE 4.

Referring now more specifically to the drawings, the numeral 10 generally designates a conventional refrigerator including a top wall 12 and a bottom wall 14 and disposed between an upper supporting structure 16 and a lower supporting structure 18.

The refrigerator 10 is supported between the structures 16 and 18 by means of upper and lower components of the instant invention generally referred to by the reference numerals 20 and 22. From FIGURES 1-3 of the drawings it may be seen that the lower component 22 includes upper and lower sections 24 and 26. The lower section 26 is generally panel-like in configuration and is secured to the support structure 18 in any convenient manner (not shown). The support structure 26 includes opposite side upstanding flange portions 28 and an upstanding front flange portion 30 as well as an upstanding rear flange portion 32. The rear flange portion terminates upwardly in a rearwardly and upwardly opening centrally apertured partial spherical socket 34.

The upper section 24 is panel-like in configuration and is secured to the bottom wall 14 of the refrigerator 10 in any convenient manner and includes opposite side depending flanges 36 as well as a depending front flange 38 and the center portion of the rear marginal portion of the upper section 24 terminates in a downwardly facing and centrally apertured partial spherical member 40.

The centrally disposed apertures 42 and 44 formed through the socket 34 and the partial spherical member 40 are somewhat enlarged and receive a removable fastener 46 therethrough whereby the upper section 24 is supported from the lower section 26 for limited universal movement.

A pair of turnbuckle assemblies 48 including thumb wheels 50 are secured between corresponding end portions of the flange portions 30 and 38 and each turnbuckle assembly 48 includes a pair of oppositely threaded screw portions 52 and 54 whose lower and upper ends, respectively, are pivotally secured to the flange portions 30 and 38 by means of pivot pins 56 and 58, respectively. Accordingly, it may be seen that the turnbuckle assemblies 48 may be utilized to adjust the refrigerator from the support structure 18.

The upper component 20 comprises generally concentric cylindrical members 60 and 62 secured to the top wall 12 and the support structure 16 in any convenient manner such as by fasteners 64 and 66, respectively, and a hollow tubular annulus 68 constructed of air impervious and flexible material is disposed between the opposing surfaces of the cylindrical members 60 and 62. The annulus 68 has a predetermined amount of air entrapped therein and the annulus 68 thereby functions to yieldingly urge the cylindrical member 60 toward concentric position relative to the cylindrical member 62. In this manner, the refrigerator 10 is supported, at least at its upper end, against horizontal vibrations and in a manner tending to maintain the upper end of the refrigerator 10 in proper centered position relative to the cylindrical member 62.

Figure 6:
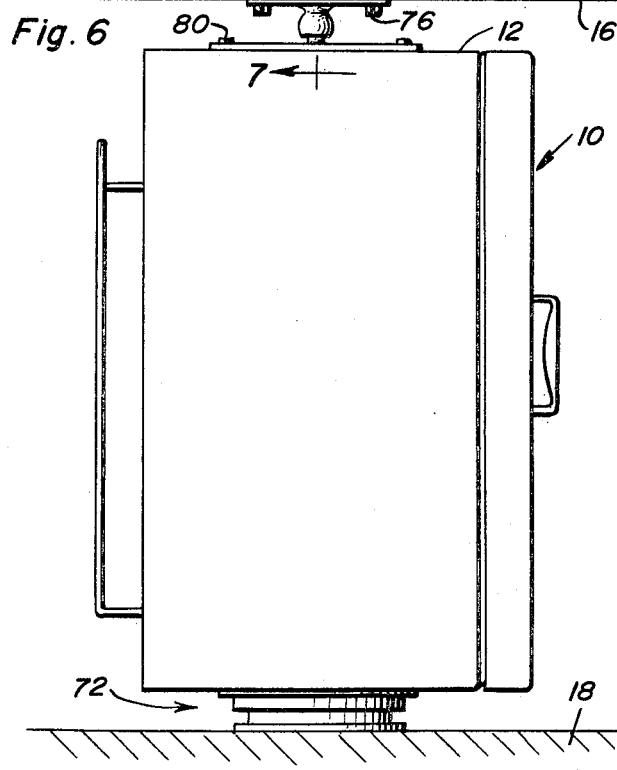
FIGURE 6 is a side elevational view similar to FIGURE 1 but illustrating the refrigerator in part supported by a modified form of upper component of the leveling mount.
Figure 7:
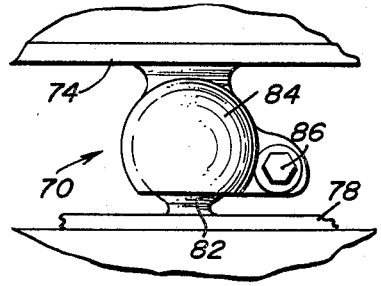
FIGURE 7 is an enlarged fragmentary vertical sectional view taken substantially upon the plane indicated by the section line 7—7 of FIGURE 6.

With reference now more specifically to FIGURES 6 and 7 of the drawings, it may be seen that the refrigerator 10 has its entire weight supported from the support structure 16 instead of from the support structure 18 and that the refrigerator 10 is supported from the support structure 16 by means of a modified lower component generally referred to by the reference numeral 70, the lower end of the refrigerator 10 in FIGURE 6 being supported from the support structure 18 by means of an assemblage comprising a substantial duplicate of the upper component 20 and generally referred to by the reference numeral 72.

The modified form of component 70 includes an upper section 74 secured to the support structure 16 by means of suitable fasteners 76 and a lower section 78 secured to the top wall 12 of the refrigerator 10 by means of suitable fasteners 80. The lower section 78 includes an upwardly projecting ball element 82 which is removably, captively and universally secured in a downwardly opening partial spherical socket assembly 84 carried by the upper section 74 by means of a fastener 86. Accordingly, it may be seen that the upper end of the refrigerator 10 is universally supported from the support structure 16 and that the lower end of the refrigerator 10 is urged toward a properly centered position by means of the component 72 comprising a substantial duplicate of the component 20.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an upstanding member including upper and lower ends and a support structure including a portion opposing and spaced vertically relative to one of said ends, first means secured between said one of said ends and said support structure portion rigidly supporting said member from said support structure portion for limited universal angular adjustment relative to a line extending between said ends and for retaining said one end in adjusted position relative to said support structure portion, said support structure including a second portion opposing and vertically spaced relative to the other end of said member, and second means secured between said second portion and said other end limiting, yieldably, movement of said other end in all directions transversely of a line extending between said first and second means.

2. The combination of claim 1 wherein said second means includes generally concentric frame-like bodies disposed generally normal to said line and secured to said second portion and other end including radially spaced circular surfaces, and annular resilient means disposed between said surfaces yieldingly limiting relative movement of corresponding portions of said bodies transversely of said line.

3. The combination of claim 2 wherein said annular resilient means comprises a hollow tubular member having a fluid disposed therein.

4. The combination of claim 3 wherein said surfaces are generally cylindrical in configuration.

5. In combination with an upstanding member including upper and lower ends and a support structure including a portion opposing and spaced vertically relative to one of said ends, first means secured between said one of said ends and said support structure portion rigidly supporting said member from said support structure portion for limited universal angular adjustment relative to a line extending between said ends and for retaining said one end in adjusted position relative to said support structure portion, said first means including means defining a ball and socket connection between said one end and said portion of said support structure, said ball and socket connection being defined by ball and socket members supported from corresponding mounting portions secured to said support structure and upstanding member, said first means also including a pair of members extendable along paths generally paralleling said line operatively secured between said mounting portions at points spaced radially outwardly from and circumferentially about said line.

6. The combination of claim 5 wherein said extendable members comprise turnbuckles.

7. In combination with an upstanding member including upper and lower ends and a support structure including first and second portions opposing and spaced vertically above and below said ends, a pair of support members including a first support member secured to one of said ends and a second support member secured to the opposing support structure portion, said first and second support members including coacting rigid ball and socket members secured together against separation supporting said one end from the adjacent opposing support structure portion for limited angular displacement of said upstanding member relative to a line extending between said support structure portions, coacting means secured to the other of said ends and the adjacent opposing support structure portion yieldingly resisting movement of the other end in all directions transversely of said line.

8. The combination of claim 7 wherein said coacting means include a pair of concentric inner and outer circular members including outer and inner opposing surfaces, and a resilient annular member disposed between said inner and outer surfaces.

9. The combination of claim 8 wherein said annular member comprises a fluid filled hollow tubular member constructed of flexible fluid impervious material.

10. The combination of claim 7 including a pair of adjustably longitudinally extendable elongated members extending between and pivotally secured, at their opposite ends, to said first and second support members disposed radially outwardly of and spaced about an axis extending between said support structure portions and through said ball and socket members.

References Cited

UNITED STATES PATENTS

| 786,093 | 3/1905 | Bostrom | 248—180 XR |
| 2,935,279 | 5/1960 | La Porte et al. | 248—22 |
| 3,001,745 | 9/1961 | Fowler | 248—357 |
| 3,008,703 | 11/1961 | Slemmons et al. | 248—22 XR |
| 3,197,161 | 7/1965 | Christofferson | 248—2 |
| 3,330,515 | 7/1967 | Janssen | 248—26 |
| 2,202,472 | 5/1940 | Tornblom | 248—226 X |

CHANCELLOR E. HARRIS, Primary Examiner

JOHN PETO, Assistant Examiner

U.S. Cl. X.R.

248—188.4; 312—245, 253